United States Patent
Penick Ib

[15] 3,650,194
[45] Mar. 21, 1972

[54] DISPOSABLE CAMERA
[72] Inventor: Penick Ib, New York, N.Y.
[73] Assignee: Simpro Corporation of America, County of Bergen, N.J.
[22] Filed: Apr. 16, 1969
[21] Appl. No.: 816,499

[52] U.S. Cl. .................................................95/61, 95/11 R
[51] Int. Cl. .......................................................G03b 9/20
[58] Field of Search .................95/11, 11 X, 53, 64, 58, 59, 95/61

[56] References Cited

UNITED STATES PATENTS

| | | | |
|---|---|---|---|
| 684,221 | 10/1901 | Gill | 95/11 |
| 2,584,912 | 2/1952 | Palmer | 95/11 |
| 3,498,199 | 3/1970 | Everburg | 95/58 |

Primary Examiner—Samuel S. Matthews
Assistant Examiner—Fred L. Braun
Attorney—Stoll and Stoll

[57] ABSTRACT

A camera comprising the combination of a box camera which is open on one side, and a self-contained film cartridge which is detachably secured to the camera to close its open side and thereby form a light tight enclosure. The camera has a photographic lens to expose the film in said cartridge, and a spring-urged apertured diaphragm shutter which is rotatably mounted between the lens and the cartridge. The camera is of simple, inexpensive construction and may be discarded following use with only a single cartridge, or it may be repeatedly used with other cartridges.

7 Claims, 21 Drawing Figures

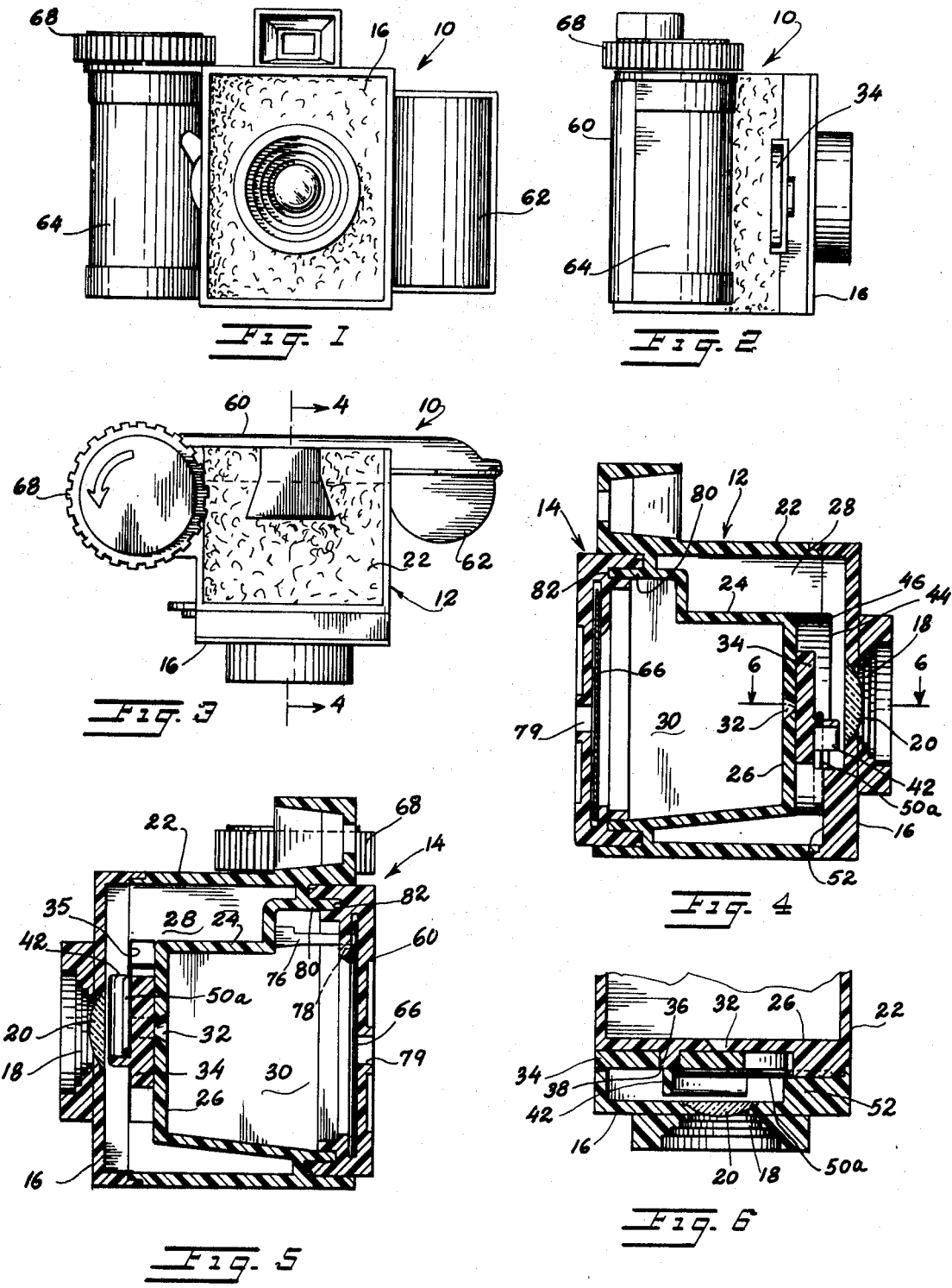

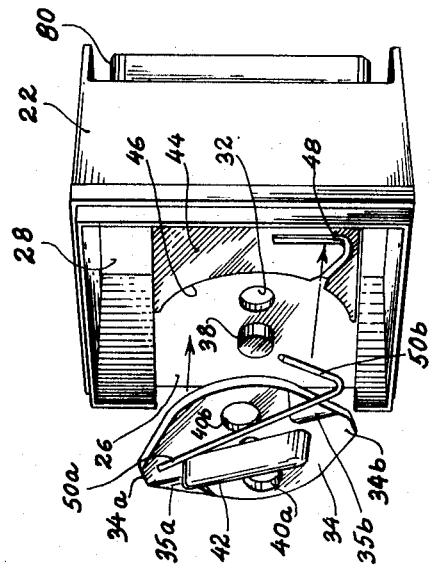
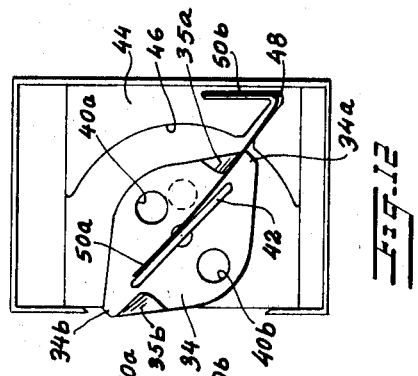
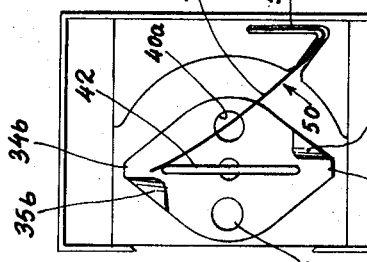
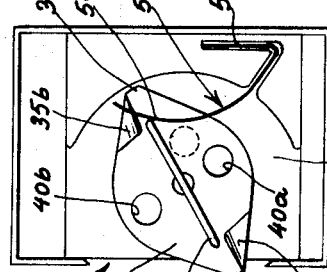
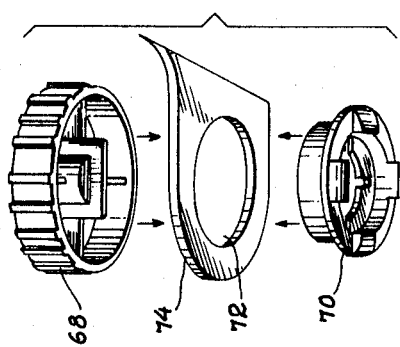
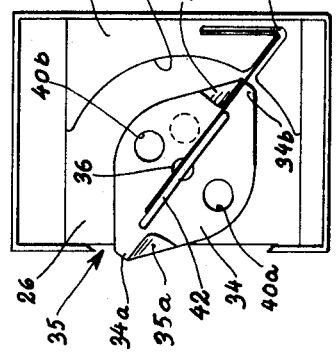

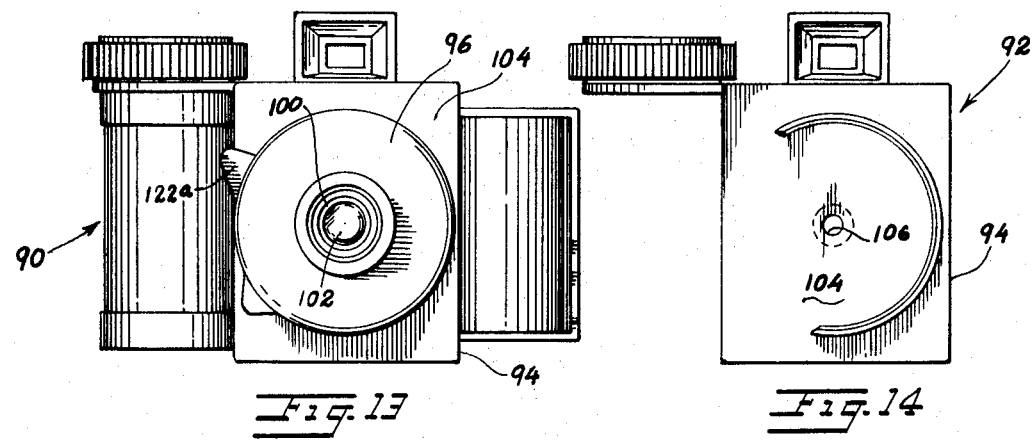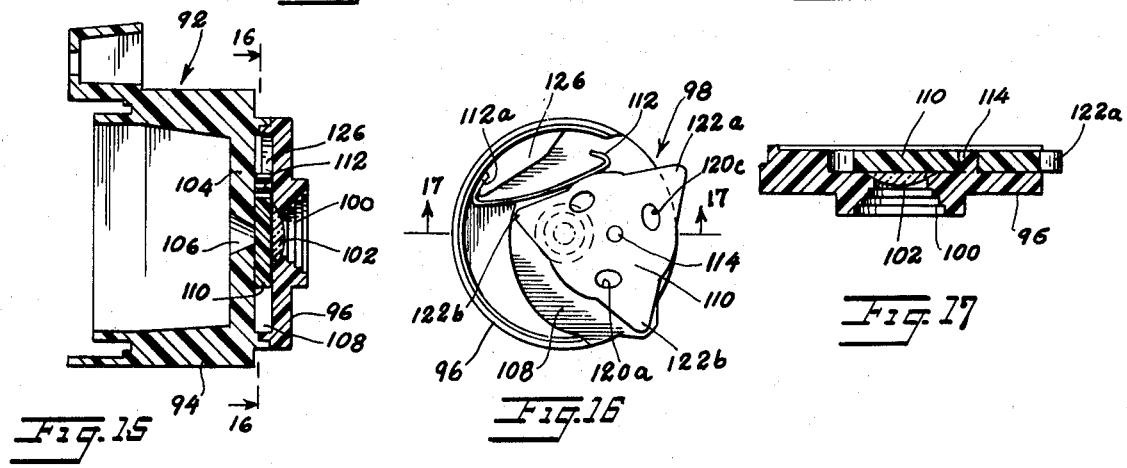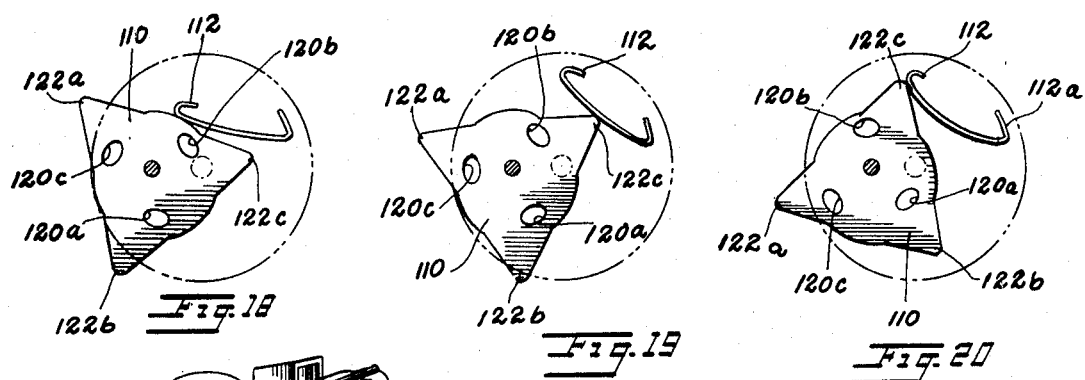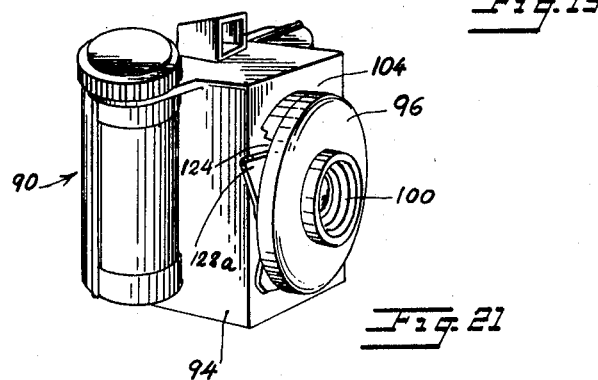

DISPOSABLE CAMERA

BACKGROUND OF THE INVENTION

1. Field of the Invention

Cameras adapted to be used with self-contained film cartridges.

2. Description of the Prior Art

In the course of a preliminary patent search conducted prior to the filing of this application, the following U.S. Pat. No. were located:

| | |
|---|---|
| 509,841 | |
| 2,083,492 | 2,751,825 |
| 2,674,166 | 2,921,509 |
| 2,685,237 | 3,138,084 |
| 2,741,168 | 3,247,773 |

U.S. Pats. No. 2,921,509 and No. 2,751,825 both show rotatable, apertured diaphragm shutters, but they lack a spring element for controlling the shutter speed. In the present invention, the shutter is spring-urged and spring-controlled to provide a predetermined exposure time. This exposure time is a constant and the human element is eliminated as a factor controlling the exposure time.

U.S. Pat. Nos. 2,741,168, 3,138,084 and 3,247,773 show various combinations of film cartridges or cassettes and cameras. However, they do not show the camera mechanism of the present invention which makes the combination feasible as a disposable commodity.

SUMMARY OF THE INVENTION

This invention provides an inexpensive, disposable camera combined with a self-contained film cartridge of the type made and sold by the Eastman Kodak Company for its Instamatic cameras. In the conventional use of such film cartridge, it is placed entirely within a camera where its sole function is that of a film holder. In the present invention, the camera is not complete in and of itself, but requires the presence of the film cartridge to complete it. More precisely, the camera is open on one side and the film cartridge is detachably secured to that side, externally of the camera, where it functions as a camera wall, in addition to its conventional function as a film holder. Instead of being large enough to receive and accommodate the entire cartridge, the camera may now be no larger than the size of a single frame.

An important feature of the invention resides in its simple, compact and inexpensive shutter mechanism. This mechanism comprises a single rotatable diaphragm, apertured for registration with the lens, and spring-urged to control its speed of rotation and produce a predetermined exposure time. The entire shutter mechanism comprises an apertured diaphragm and a spring which engages it.

BRIEF DESCRIPTION OF THE DRAWING

FIG. 1 is a front or face view of a camera made in accordance with the preferred form of this invention.

FIG. 2 is a side view thereof.

FIG. 3 is a top view.

FIG. 4 is a vertical section on the line 4—4 of FIG. 3.

FIG. 5 is a section similar to that of FIG. 4 but viewed in the opposite direction.

FIG. 6 is a fragmentary horizontal section on the line 6—6 of FIG. 4.

FIG. 7 is an exploded perspective view of the film windup knob of the camera.

FIG. 8 is an exploded perspective view of the camera housing and spring-urged shutter.

FIG. 9 is a schematic view showing the starting position of the shutter, prior to manual actuation thereof.

FIG. 10 shows a second shutter position after it is moved manually to the point where the spring is loaded and ready to exert a thrusting force against the shutter. FIG. 11 shows an intermediate position of the shutter during its movement under the force exerted by the spring, one of the apertures in the shutter being shown in registration with the aperture in the camera partition and being, consequently, in registration with the lens.

FIG. 12 represents the final approach of the shutter to its second position of rest 180° removed from its position in FIG. 9.

FIG. 13 is a front view of a second embodiment of this invention.

FIG. 14 is a fragmentary view with the lens mount and shutter mechanism removed.

FIG. 15 is a sectional view through the camera body, lens mount and shutter mechanism.

FIG. 16 is a back view of the shutter mechanism looking in the direction of arrows 16, 16.

FIG. 17 is a section through the lens mount and shutter mechanism.

FIG. 18 is a schematic view showing the starting position of the shutter mechanism.

FIG. 19 is another schematic view showing a second phase of the shutter operation.

FIG. 20 is a schematic view showing a third phase of the shutter operation.

FIG. 21 is a fragmentary perspective view showing one of the outwardly projecting parts of the shutter in relation to the rest of the camera.

DESCRIPTION OF PREFERRED EMBODIMENTS OF THE INVENTION

Referring now to the preferred form of this invention as illustrated in FIGS. 1 to 12 of the drawing, it will be seen that camera 10 which is therein illustrated comprises the combination of an incomplete camera 12 and a film holder 14 which is detachably secured to said incomplete camera in order to complete it. Incomplete camera 12 is complete in all respects except for a back wall. Instead of being closed at the back, as is the case of conventional cameras, it is open at the back, and what closes it, in order to form a light-proof casing or enclosure, is the film holder 14.

Incomplete camera 12 is provided with a front shell 16 having a lens opening 18 formed therein and a lens 20 fitted into said opening. Front shell 16 is secured to an outer body shell 22, and integral with said outer body shell is an inner shell 24. The wall of said wall 26 of said inner shell defines a partition which separates two compartments 28 and 30 from each other. Compartment 28 is an outer compartment whose front wall is the front wall of shell 16 and compartment 30 is an inner compartment whose front wall is partition 26. An aperture 32 is formed in said partition 26 in axial alignment with the lens.

Compartment 28, and more particularly that forward portion of said compartment which lies between the front wall of shell 16 and partition 26, contains the shutter mechanism. It will be observed that the shutter 34 comprises a thin flat diaphragm generally oval in plane view, and having a pair of oppositely disposed, tapered reduced end portions 34a and 34b, respectively. Shutter 34 has a centrally formed socket 36 which receives a cylindrical stud 38 formed on the front of partition 26 adjacent the partition aperture 32. The shutter is rotatably mounted on said stud, its axis of rotation being parallel to the lens axis, its rotational plane being perpendicular to said lens axis. Shutter 34 is also provided with a pair of apertures 40a and 40b which are formed therein on opposite sides of socket 36. It will be noted in FIGS. 9 to 12 that apertures 40a and 40b are registrable with partition aperture 32 when the shutter is caused to rotate about the axis of stud 38.

Formed on shutter 34 is a flange 42. This flange is centered on the shutter between the two apertures 40a and 40b, and its longitudinal axis coincides, substantially, with the longitudinal axis of the shutter itself, extending diametrically across socket 36 between its two reduced end portions 34a and 34b. Flange 42 stands in a plane which is perpendicular to the face of the shutter. The function of this flange will shortly be described.

Formed on the face of partition 26 is an embossment 44 which has an arcuate inner side edge 46 concentric with the circumferential path of movement of the reduced ends 34a and 34b of the shutter. A generally V-shaped cutout 48 is formed in embossment 44 to accommodate a leaf or wire spring 50.

It will be observed in FIGS. 8 to 12 that spring 50 has a relatively long arm 50a and a relatively short arm 50b disposed at an angle to the long arm. This angle corresponds substantially to the angle of the V-shaped slit 48 in embossment 44. Accordingly, the short arm and the adjacent portion of the long arm of the spring may be inserted into said V-shaped slit to hold the spring in operative position relative to the shutter and flange 42 thereon. A second embossment 52 is formed on the inside of the front wall of shell 16, and it will be observed in FIG. 4 of the drawing that this second embossment is positioned across the V-shaped slit 48 in the first embossment to lock the spring in place therein.

The operation of the shutter mechanism will now be described. The starting position of the shutter is shown in FIG. 9 of the drawing. It will there be seen that spring 50 engages the forward face of the shutter, as well as flange 42 formed thereon. In this starting position the long arm 50a of the spring parallels the flange and engages one side thereof. In this phase of the operation of the shutter mechanism, the spring serves to hold the shutter in its starting position. The shutter is snapped by manually engaging its reduced end 34a which projects outwardly from the camera casing through slit 35, and moving it downwardly and in counterclockwise direction, as viewed in FIG. 9. This movement causes one end of flange 42 to wipe against the long arm of the spring and to bias and load it. At a given point in this angular movement of the shutter, generally 45° from its starting position, the flange will be centered with respect to the spring so that the spring, although fully loaded, would exert no angular force against the flange. When this center point is passed, however, the loaded spring will engage the opposite side of the flange (from the side which was engaged in the starting position of FIG. 9) and the spring will thrust the shutter forwardly to continue its counterclockwise movement, at an accelerated, predetermined angular speed. A past-center position of the shutter relative to the spring is shown in FIG. 10.

The counterclockwise movement of the shutter continues through the position shown in FIG. 11. In this position one of the apertures in the shutter, to wit: aperture 40a, registers with aperture 32 in partition 26 and with lens 20. It is at this moment that the film is exposed. Continued counterclockwise movement of the shutter, still under the influence of the loaded spring, brings the shutter to its FIG. 12 position, immediately before it reaches its position of rest. In such position of rest the shutter is 180° removed from its position in FIG. 9. The spring now rests against the opposite side of the flange from the side which it engaged in its FIG. 9 position. Reduced end portion 34b of the shutter now projects outwardly from the camera housing, whereas previously it was reduced end 34a which so projected.

Once the shutter reaches this position of rest, it is ready for the next film exposure. End portion 34b is now manually actuated to rotate the shutter in counterclockwise direction and to reload the spring in the manner above described. Aperture 40b of the shutter will be brought into registration with aperture 32 on the partition and with the lens to expose the next frame of the film. This procedure continues until the film is fully exposed.

A boss 35a is formed on shutter 34 at end 34a thereof and laterally offset from flange 42, so that spring 50 may snap between them. This will prevent a backlash of the shutter from its position of rest and thereby prevent a double exposure of the same film. A similar boss 35b is formed at the opposite end of shutter 34, laterally offset from the opposite side of flange 42, to perform the same locking function when the shutter is rotated 180° to resume its FIG. 9 position.

It will be seen in FIGS. 1 to 4 of the drawing that film holder 14 is of conventional construction and design. It is a film cartridge comprising a casing 60 which is closed at the back and all sides and open at the front (facing the camera lens) and is provided with a pair of tubular receptacles 62 and 64, respectively, which are adapted to receive and accommodate a pair of film reels. The film 66 passes from the reel in receptacle 62 to the reel in receptacle 64, past the open front of the film holder.

A knob 68 is connected to a clutch element 70 through an opening 72 in a lug 74 formed on the camera body. The clutch 70 engages the film reel in receptacle 64 and it is manually rotated in conventional fashion to advance the film, frame by frame, and to roll it up on the reel which the clutch engages. In order to register the individual frames with the front opening in the film holder, a flexible resilient finger 76 is provided on the inner camera body, and it will be noted that said finger enters a horizontally elongated opening 78 forming in the film holder. In conventional manner, this finger sequentially engages a series of slots formed in the film and thereby registers the individual frames with the front opening in the film holder. As the flexible finger wipes against the film and then snaps into each frame slot, an audible click will be produced to inform the user that a frame has been positioned for exposure. The frame number will be exposed through an opening 79 in the back wall of the frame holder. Following exposure, the film may be advanced to the succeeding frame and the flexible finger will flex out of the slot associated with the exposed frame and will then snap into the slot which is associated with the succeeding or unexposed frame.

It will be understood from the preliminary sections of this specification that film holder 14 is a conventional cartridge which may be removably attached to the camera body. This may be done in various ways, as for example a press fit. Flanges 80 on the back of the camera body will enter grooves 82 in the film cartridge to effect a tongue-and-groove joint. A light-tight seal will thereby result, and the combination of the incomplete camera body and the film cartridge will comprise a self-contained camera, including the film. Following exposure of the film, the cartridge may be disengaged from the camera body, so that the film may be developed and processed in conventional fashion. The same camera body may be repeatedly connected to fresh film cartridges for continued use, or it may be discarded. In this connection it will be noted that the camera body is made of molded plastics, that the shutter mechanism is of simple construction, and that the entire assembly consists of a relatively few number of parts, readily combined and forming a most inexpensive, disposable package.

Turning now to the second form of this invention as illustrated in FIGS. 13 to 21 of the drawing, it will be understood that it embodies the same combination as previously described, namely, a film holder or cartridge 90 and an incomplete camera 92 detachably secured to said cartridge, said camera being incomplete only in the sense that it lacks a back wall. The film holder functions as the back wall of the camera, in addition to performing its conventional function of providing the camera with film to be exposed therethrough.

Specifically, the film cartridge 90 is of the same construction as the one previously described, and it need not again be described in connection with the second form of the invention. The incomplete camera 92 comprises a camera body 94, a lens mount 96 and a shutter mechanism 98. The lens mount comprises a shell with a lens opening formed therein and a lens 102 mounted in said opening. As appears in FIG. 15, the lens mount 96 is secured to the front wall 104 of the camera body 92. An aperture 106 is formed in said front wall in axial alignment with lens 102 and the lens opening 100. Between the front wall of the lens mount and the front wall of the camera body is a chamber 108 which accommodates the shutter mechanism 98.

The shutter mechanism comprises a diaphragm 110 of generally triangular shape and a leaf spring 112 which engages the side edges of said diaphragm. The diaphragm is rotatably mounted on a stud 114 which is formed on the front wall 104 of the camera body. This stud is laterally offset from aperture 106.

Formed in the triangular diaphragm or shutter are three equally spaced apertures 120a, 120b and 120c. The radial distance from stud 114 to each of these apertures 120a, 120b and 120c corresponds to the distance between said stud and aperture 106. Consequently, when the shutter is caused to rotate in the manner about to be described, its three apertures sequentially register with aperture 106 and with the camera lens.

Shutter 110 is provided with three corner portions 122a, 122b and 122c, respectively. These corner portions sequentially project outwardly from the camera through slit 124. They may be manually engaged in order to rotate the shutter. Each phase of the shutter operation extends over an angular distance of 120° of shutter travel, and in each such phase the shutter first loads the spring and the spring then drives the shutter at a predetermined rate of speed to provide a predetermined exposure time as each shutter aperture moves across aperture 106.

It will be observed that spring 112 has two bent end portions and is bowed in the middle. One bent end portion 112a is held in place in a slit formed in embossment 126 formed on the front wall 104 of the camera body. The inside wall of the lens mount 96 holds the spring in place in said slit. The main body of the spring bears against the side edges of the shutter in order to control its position and drive it in the manner described.

The sequence of shutter operations is shown in FIGS. 18 to 20. In FIG. 18 the shutter is in its starting position, being held in that position by the spring. Corner 122a of the shutter is manually actuated and the shutter is caused to rotate in counterclockwise direction as viewed in FIG. 18. This causes the spring to bias and to load as shown in FIG. 19. The moment corner 122c of the shutter passes the center point in relation to the spring, the spring will act upon the shutter and propel it at a predetermined angular speed in the same counterclockwise direction. See FIG. 20. It is during this phase of the operation that shutter aperture 120a will register with camera body aperture 106 and with the camera lens in order to expose the film. This procedure is repeated twice more for each 360° of revolution of the shutter.

It will be noted in the drawing that shutter apertures 120a 120b and 120c are elongated in shape to form a generally oval or elliptical configuration. The minor axis of this configuration corresponds to the diameter at the small end of aperture 106; the major axis exceeds such diameter. The purpose of this arrangement is to prolong the exposure time resulting from registration of the shutter apertures with aperture 106. Stated differently, one method of adjusting the exposure time is to adjust the length of the shutter apertures relative to aperture 106. Another method is to adjust the tension of the spring which engages the shutter. Increasing its tension will increase the effective speed of rotation of the shutter and thereby shorten the exposure time. Conversely, decreasing the spring tension will reduce the effective rotational speed of the shutter and thereby increase the exposure time.

The foregoing principles of exposure time adjustment apply equally as well to the preferred form of this invention as above described. Moreover, the two forms of the invention which are herein shown and described illustrate various methods of varying and modifying the present invention within the scope of the appended claims. Thus it will be understood that the number of shutter apertures may be varied in accordance with design preferences and requirements. A single aperture or two, three or more may all be used in accordance with the principles of this invention. This is equally true of the number of outwardly projecting shutter portions which are manually engageable to operate the shutter. Similarly, one or more springs may be incorporated into the shutter mechanism, since it is immaterial whether the shutter is propelled by a single spring alone or by a plurality of springs. The number of springs may determine smoothness of operation, rotational speed, and hence exposure time.

I claim:
1. A camera comprising:
   a. a housing,
   b. a lens at one end of said housing,
   c. a film holder at the opposite end of said housing, and
   d. a shutter between said lens and said film holder,
   e. said shutter comprising a spring-urged, rotatably mounted diaphragm having at least one aperture which is registrable, on rotation of the diaphragm, with the lens,
   f. a slit being formed by the housing adjacent the shutter,
   g. said diaphragm comprising a plurality of offset portions each of which, upon rotation of said diaphragm, alternately projects outwardly through said slit for manual actuation thereof and extends inwardly of the housing for engagement with, and actuation by, said spring.
2. A camera in accordance with claim 1, wherein:
   a. a partition is provided in the housing between the lens and the film holder, in spaced relation to both,
   b. said partition having an aperture formed therein in coaxial relation to the lens,
   c. said diaphragm being mounted between the lens and the partition and normally covering the partition aperture,
   d. said diaphragm being rotatable to register its aperture with the partition aperture and lens.
3. A camera in accordance with claim 2, wherein:
   a. the diaphragm and the spring which urges it are both mounted on the partition,
   b. the diaphragm is rotatably mounted thereon, and the spring is fixedly mounted thereon.
4. A camera in accordance with claim 3, wherein:
   a. the spring is positioned to be biased by engagement with the leading side of an inwardly extending offset portion of the diaphragm when an outwardly projecting offset portion thereof is manually moved a predetermined angular distance,
   b. said spring being thereby loaded and adapted to engage the following side of said inwardly extending offset portion in order to drive the diaphragm a predetermined angular distance at a predetermined angular speed,
   c. whereby the diaphragm aperture is moved into and out of registration with the camera lens and the partition aperture to provide a predetermined film exposure time.
5. A camera in accordance with claim 4, wherein:
   a. the diaphragm is provided with a plurality of spaced apertures which are sequentially registrable with the camera lens and partition aperture upon rotation of the diaphragm,
   b. said plurality of offset portions being sequentially manually engageable to move the diaphragm a predetermined angular distance and to bias and load the spring,
   c. thereby enabling the spring to apply successive driving forces to the diaphragm in order to cause its several apertures to move sequentially into and out of registration with the camera lens and partition aperture at predetermined angular speeds and thereby to provide predetermined exposure times.
6. A camera in accordance with claim 1, wherein:
   a. the housing is open at the end opposite the lens,
   b. the film holder being detachably secured to said open end of the housing to close said end, and
   c. thereby comprise one wall of the camera.
7. A camera in accordance with claim 6, wherein the film holder comprises:
   a. a casing which is open at the front facing the lens and closed at the back and all sides,
   b. said casing having a pair of tubular chambers at opposite sides thereof to accommodate a pair of film reels, and
   c. a film extending and sequentially movable from one reel to the other across the open front of the film casing and the open end of the camera housing for exposure through the diaphragm aperture and the lens.

* * * * *